United States Patent [19]

Myhre et al.

[11] Patent Number: 5,341,307
[45] Date of Patent: Aug. 23, 1994

[54] APPARATUS AND METHOD FOR CONTROLLING FLOW RATE IN VIBRATORY FEEDERS

[75] Inventors: John B. Myhre, Pitman, N.J.; Stefan Ludescher, Oftringen, Switzerland

[73] Assignee: K-Tron Technologies, Inc., Wilmington, Del.

[21] Appl. No.: 21,531

[22] Filed: Feb. 19, 1993

[51] Int. Cl.$^5$ ............................................. G06F 15/20
[52] U.S. Cl. .................................... 364/479; 177/105; 222/58; 364/164; 364/567
[58] Field of Search ............... 364/148, 164, 165, 478, 364/479, 567, 554; 222/56, 58, 77; 177/50, 59, 105

[56] References Cited

U.S. PATENT DOCUMENTS

| | | | |
|---|---|---|---|
| 4,331,263 | 5/1982 | Brown | 222/63 |
| 4,544,280 | 10/1985 | Mitsukawa | 366/141 |
| 4,843,579 | 6/1989 | Andrews et al. | 364/567 |
| 4,913,281 | 4/1990 | Muller | 198/763 |
| 4,954,975 | 9/1990 | Kalata | 364/567 |
| 5,074,403 | 12/1991 | Myhre | 198/751 |
| 5,081,600 | 1/1992 | Tump | 364/571.08 |
| 5,103,401 | 4/1992 | Johnson | 364/479 |
| 5,132,897 | 7/1992 | Allenberg | 364/149 |
| 5,149,080 | 9/1992 | Yamamoto | 271/265 |
| 5,260,880 | 11/1993 | Tump | 364/479 |

*Primary Examiner*—Joseph Ruggiero
*Attorney, Agent, or Firm*—Ratner & Prestia

[57] ABSTRACT

A method and apparatus for controlling the actuator in a vibratory weigh feeding system, to adjust the discharge rate. The vibratory weigh feeding system has a material containers an actuator for vibrating the container, weighing apparatus for sensing the weight of the material being discharged and apparatus for estimating the material discharge rate. A plurality of drive command values are established. A respective predicted discharge rate and a respective reliability factor are associated with each respective drive command value. The current discharge rate is estimated. A setpoint value is selected. A drive command value associated with the predicted discharge rate that is substantially equal to the setpoint discharge rate is selected. The selected drive command value is reduced according to the two respective reliability factors associated with the two predicted discharge rates closest to the setpoint. This forms a reduced drive command value. A drive command signal representing the reduced drive command value is transmitted to the actuator, setting the discharge rate. The respective reliability factor associated with the selected drive command value is increased, if the respective predicted discharge rate differs from the estimated discharge rate by less than a predetermined amount.

15 Claims, 14 Drawing Sheets

Microfiche Appendix Included
(1 Microfiche, 82 Pages)

APPARATUS AND METHOD FOR CONTROLLING FLOW RATE IN VIBRATORY FEEDERS

A portion of the disclosure of this patent document contains material which is subject to copyright protection. The copyright owner has no objection to the facsimile reproduction by anyone of the patent document or the patent disclosured as it appears in the Patent and Trademark Office patent file or records, but otherwise reserves all copyright rights whatsoever.

A microfiche appendix is included in this application containing 1 microfiche. The microfiche contains 82 frames plus one test target frame, for a total of 83 frames.

BACKGROUND OF THE INVENTION

The present invention relates to a loss-in weight feeder (LWF) that utilizes a vibratory tray to convey material.

Vibratory feeders exhibit many advantages over other types of material feeding systems such as belt feeders or motor driven auger feeders. For example, non-vibratory feeders, while exhibiting excellent long-term control over material feeding, often have non-uniform material feeding over the short term. Non-vibratory feeders are often unacceptable for applications, such as ingredient mixing, that require that specified material ratios be maintained at all times.

Vibratory feeders are also mechanically simpler than these other types of feeders because they operate without bearings, motor brushes, seals and the like. This results in a higher reliability and lower cost material feeder compared with other types of material feeders, and since vibratory feeders typically have no sparking electrical contacts, they are readily adaptable to highly explosive hazardous environments.

In addition, since the only component of the vibratory material feeder that is in direct contact with the material being fed is a feed tray, or the like, cleaning is greatly simplified. Vibratory feeders also exhibit excellent temperature stability, and are capable of operating with high efficiency; for example, feeding 25 tons of material per hour with only 60 watts electrical input.

Howevers commercially available vibratory feeders are not without disadvantage. Material feed rate is not easily controllable because of the non-linear relationship existing between the actual feedrate and the vibratory drive voltage. For example, doubling the drive voltage may result in an actual feedrate increase of ten times.

Another disadvantage of the vibratory feeder is that the feedrate is not zero based. That is a power greater than zero must be applied before the material will begin feeding.

In addition, when materials having different physical properties are used, or when mechanical changes are made to the vibratory feeder, such as changing the feeding tray or changing the springs, the resulting performance may be radically changeds and the mass flow rate may vary from the desired setpoint rate. Nevertheless, users may continue operating the feeding system while changing materials to avoid the need to shut down other equipment receiving material from the feeding system, such as an extruder, or molding equipment.

Another disadvantage of vibratory feeders is that with some material, a build up occurs on the feeding tray that alters feeding performance of the machine over time.

To users of the vibratory feeder, the above disadvantages are cause for concern, because typically the vibratory feeder is dosing material at some desired feedrate (setpoint) into an extruder. The extruder is not tolerant to over feeding and built-in safety circuits in the extruder will shut down the entire system if significant overfeeding occurs.

SUMMARY OF THE INVENTION

The invention is an a method and apparatus for controlling the actuator in a vibratory weigh feeding system, to adjust the discharge rate. The vibratory weigh feeding system has a material container, an actuator for vibrating the container, weighing apparatus for sensing the weight of the material being discharged and apparatus for estimating the material discharge rate.

A plurality of drive command values are established. A respective predicted discharge rate and a respective reliability factor are associated with each respective drive command value.

The current discharge rate is estimated. A setpoint value is selected. A drive command value associated with the predicted discharge rate that is substantially equal to the setpoint discharge rate is selected. The selected drive command value is reduced according to the respective reliability factors associated with the two predicted discharge rates closest to the setpoint. This forms a reduced drive command value.

A drive command signal representing the reduced drive command value is transmitted to the actuator, setting the discharge rate. The respective reliability factor associated with the selected drive command value is increased, if the respective predicted discharge rate differs from the estimated discharge rate by less than a predetermined amount.

DETAILED DESCRIPTION

Figure 1:
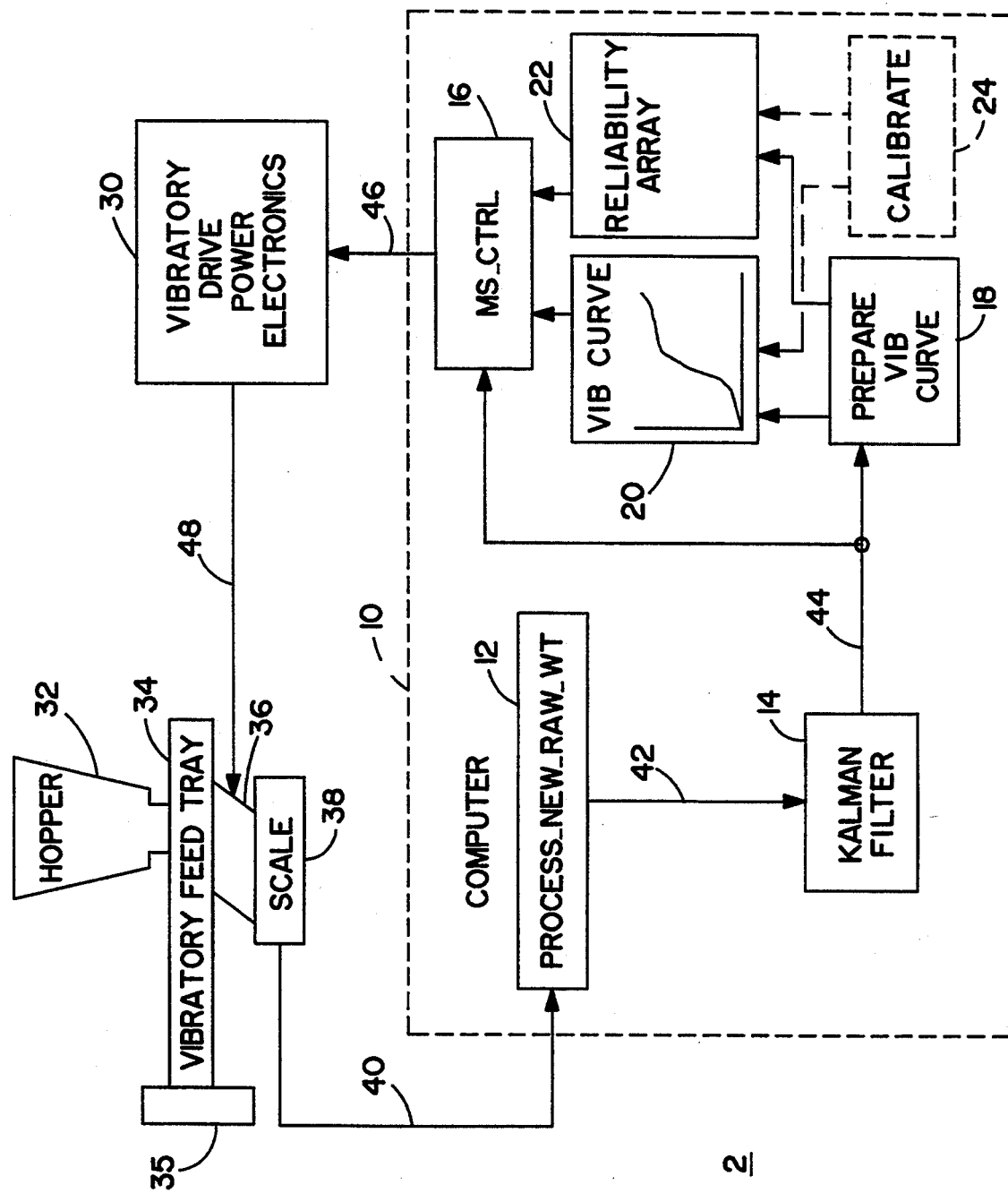
FIG. 1 is a block diagram showing an exemplary embodiment of the invention.

FIG. 1 is a block diagram showing an exemplary embodiment of the invention. A vibratory loss-in-weight feeder (LWF) 2 includes a weigh hopper 32. Weigh hopper 32 is a container into which material is dropped periodically from a storage hopper (not shown). A vibratory feed tray 34 is located at the bottom of hopper 32. Material is held in the tray 34. A vibratory drive or actuator 36 vibrates tray 34. As the tray vibrates the particles in the tray hop down towards the discharge outlet 35 of tray 34.

Actuator 36 may be an adjustable spring system, such as the actuator described in U.S. Pat. No. 4,913,281 to Muller, which is expressly incorporated herein by reference. In the exemplary embodiments the speed of actuator 36 may be varied, to vary the vibration frequency. A method for controlling the vibration frequency of a vibratory feeder is described in U.S. Pat. No. 5,074,403 to Myhres which is also expressly incorporated herein by reference. It is also understood that the flow rate may be controlled by modulating the amplitude of the drive command signals instead of the frequency. Alternatively, both amplitude and frequency may be varied.

Weigh hopper 32, feed tray 34, discharge outlet 35 and actuator 36 are installed on a weighing apparatus, such as scale 38, for sensing the weight of the material being discharged. As the feeding proceeds, the weight of the hopper 32 is monitored continuously. Raw weight data 40 are transmitted to the vibratory drive control means, which are embodied in software programs that execute in a processor 10. It is understood that the control functions that are executed within processor 10, as shown in FIG. 1, may alternatively be implemented in application specific integrated circuits (ASIC).

The weight data are processed in raw weight data processing function 12, when data is passed by an interrupt routine. A partially processed weight signal 42 is then provided to a Kalman filter 14. The weight data 42 are subject to errors from several sources, including sensor noise, external electronic noises mechanical movement of the feeder, lumpy material, refilling the weigh hopper 32, and environmental effects, such as vibration from nearby machines.

Kalman filter 14 takes these factors into account and provides filtered estimates of the current weight and massflow rate 44 based on two states Kalman filter theory. Filter 14 gives the covariance matrices of the estimation and prediction errors. Kalman filter 14 also performs motor speed gravimetric control by commanding the motor speed control (ms_ctrl) function 16. The drive command signals 46 are transmitted to the vibratory drive power electronics 30. Electronics 30 generates an AC voltage signal 48. Signal 48 controls the frequency of actuator 36, to control the discharge rate. Thus, the Kalman filter 14 provides closed loop control over the drive command that sets the material discharge rate. A Kalman filter suitable for use in accordance with the present invention is described in U.S. Pat. No. 4,954,975 to Kalata, which is expressly incorporated herein by reference. The additional functions performed in the present invention are described in detail below, and the appendix includes a listing of the softwares including the Kalman filter 14.

Kalman filter 14 also provides feedback to the vibratory curve preparation function 18. This function updates the vibratory curve 20, which relates the magnitude of the drive command to a predicted material discharge rate. A plurality of drive command values 20a–20t are established and are stored in a vibratory curve table or array (referred to in the software appendix as yp) within a memory in processor 10. Vibratory curve points 20a–20t are stored in the respective array elements yp(0) through yp(19). Drive command values 20a and 20t are determined by the respective lower and upper input signal limits that are accepted by the vibratory drive (actuator) 36. The vibratory curve 20 is a function that associates a respective predicted discharge rate with each respective drive command value.

Figure 2:
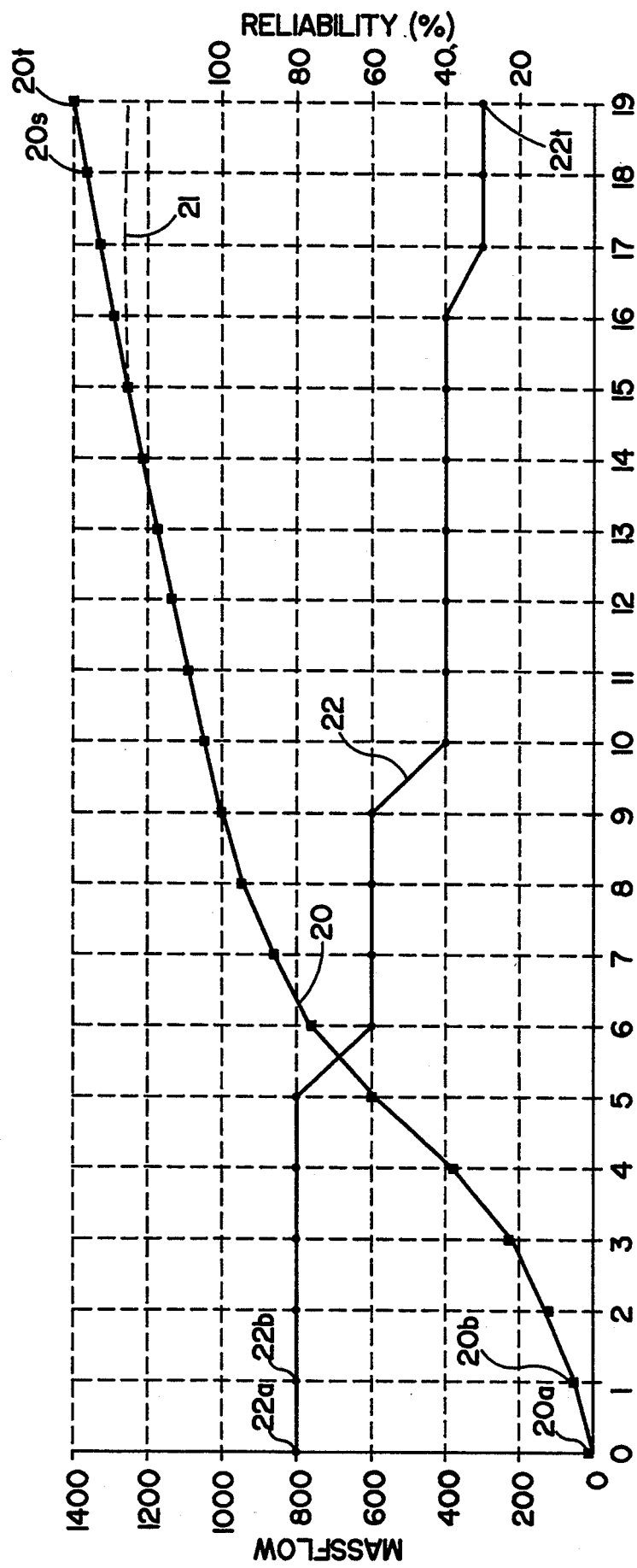
FIG. 2 is a diagram of the vibratory curve and the reliability array plotted against the drive commands as shown in FIG. 1.

In the exemplary embodiments there are twenty drive command values 20a–20t in vibratory curve 20, as shown in FIG. 2. Each drive command value is associated with a respectively different frequency ranging from 500 to 10,000 Hertz. The vibratory curve 20 is non-linear, and typically is "S" shaped. The use of 20 values in vibratory curve 20 allows for reasonably accurate estimation of intermediate drive commands (for producing intermediate discharge rates) via linear interpolation between the two points in the vibratory curve 20 that are closest to the discharge rate for which a drive command value is desired.

It is understood by one skilled in the art that vibratory curve 20 may be represented by a different number of points. However, if the number of points is too small, linear interpolation between contiguous points may not be accurate enough to account for non-linearities in the vibratory curve. If the number of points is substantially larger than 20, the computational load in processor 10 increases.

The actual mass flow rate for a level of drive command depends on a number of factors, including type of the material, temperature, humidity and changes in the apparatus, among others. The vibratory curve 20 is initially set to represent an average operating condition based on empirical data.

Referring again to FIG. 1, vibratory curve preparation function 18 updates the values stored in the vibratory curve 20, if several conditions are met indicating that accurate data is available. The conditions include the following:

(1) The massflow (discharge) rate estimated by the Kalman filter 14 is near the desired setpoint value (i.e., within 50% of the setpoint rate).

(2) The weigh hopper 32 is not close to being empty (i.e., the net weight of the material is greater than 2% of the range of scale 38.

(3) The feeder is running in steady state (i.e., the setpoint has not been changed recently).

(4) The weigh hopper 32 is not being refilled from the storage hopper (not shown).

(5) The current drive command value is within the working range. For the exemplary embodiment, the working range is from 500 to 10,000 Hertz.

Function 18 also updates a "reliability array" 22, referred to in the software appendix as "yp$_{13}$ rel". The respective discharge rate associated with each drive command value 20a–20t has an associated reliability factor 22a–22t. Each reliability factor 22a–22t is stored in a respective element yp_rel(0) through yp_rel(19) of a reliability array yp_rel. Because there are so many factors that can influence the actual mass flow rate produced by any given drive command, the predicted discharge rates in the vibratory curve 20 may be "unreliable" when the feeding system 2 is first started, when the setpoint changes, and when a new material is placed in hopper 32. The reliability array 22 quantifies the degree of uncertainty in the predicted discharge rates in the vibratory curve 20. The reliability factor 22(I) for a given respective predicted discharge rate 20(I) may be as small as zero, or as large as 100. If the reliability factor 22a–22t is low for a particular predicted discharge rate 20a–20t, there is greater uncertainty in that predicted discharge rate. As the LWF 2 continues to operate for an extended period without a setpoint changer the "reliability" of the current predicted discharge rate 20a–20t improves, and the associated reliability factor for the current predicted discharge rate (and drive command value) is increased.

It is particularly undesirable to overshoot the setpoint discharge rate, because overshooting might harm the extruder (not shown), Therefore, the invention deliberately reduces the drive command value below the value associated with the setpoint, if the reliability factor for the current drive command value is low. The lower the reliability, the greater the percentage by which motor speed control 16 undershoots the setpoint. This biases the motor speed control 16, so that errors in the predicted discharge rate (vibratory curve) array 20 tend to result in undershooting the setpoint, not overshooting. The actual relationship between the reliability factor and the percentage reduction is discussed in greater detail below.

The extreme case (i.e., when reliability is lowest at any drive command value), is when the LWF 2 is first started. In that cased the reliability factors in array 22 are set to zero for all values of the drive command. This results in undershooting the drive command by 20%, for any setpoint value. Preferably, the calibration function 24 is executed upon startup, to increase the reliability of the vibratory curve table 20. Accordingly, the factors 22a–22t in array 22 are increased after a calibration is performed by function 24. FIG. 2 shows the initial reliability factors 22a–22t that are stored in the reliability array 22 immediately after the calibration function 24 is executed.

Referring now to FIGo 3, the process steps executed by processors 10 (shown in FIG. 1), and in particular, Kalman filter 14 are shown.

After the process is started, nominal parameter values and nominal variable values are initialized in step 126 by, for example, operator entry or retrieval from memory. Control then passes to decision step 127 where it is determined whether or not the weigh feeder should be calibrated. If the operator chooses not to calibrate, control passes from step 127 to step 128. If, however, calibration is selected by the operator; control passes to step 129 where calibration of parameters is performed.

In step 128, Kalman filter 14 is initialized and control then passes to step 130 where weight and motor speed measurements are retrieved from scale 38 and actuator 36, respectively. Control then passes sequentially through steps 131 and 132 where noise covariance matrices for motor speed ($Q_m$) and weight ($Q_w$) are calculated. Then, in step 133, rate estimates for motor speed ($V_m$) and weight ($V_w$) are obtained. Control then passes to step 134 where combining coefficient C is recalculated, and a total weight rate estimate, $V_T$, is also calculated. Control then passes to step 135 where correlation factor, $A_c$, is updated. Then in step 136, it is determined whether a bridge in the material being fed has formed. In step 137, motor control signal, 48, is calculated and is output to control the speed of the motor/actuator 36. The vibratory curve 20 and the reliability array 22 are updated, if appropriate. Control is then returned back to step 30 for new measurements, and control continues cyclically thereafter.

Figure 3:
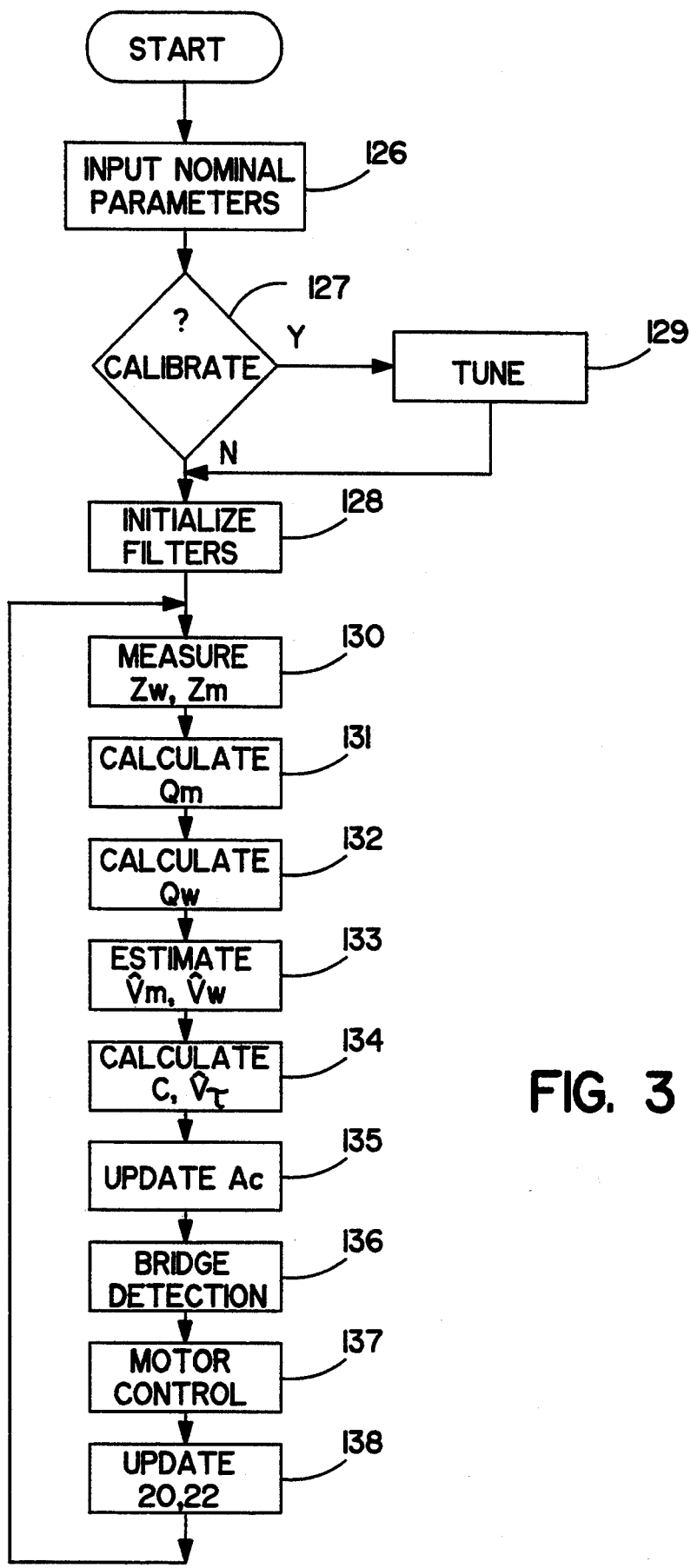
FIG. 3 is a flow chart of the processes performed by the Kalman filter shown in FIG. 1.

Empirical results have shown that there is some oscillation in the mass flow rate. Typically, the period for these oscillations is in the range from 7 to 20 seconds, depending on the material and environmental conditions. The appropriate length of time between vibratory curve 20 updates and reliability array 22 updates is the same 7 to 20 second value. In the exemplary embodiment, the above loop, as shown in FIG. 3, is executed every 1 to 3 seconds, and the vibratory curve 20 and reliability array 22 are only updated every seventh time the loop is executed. This ensures that variations in the flow rate and drive command are reflected in the updated curves 20 and 22.

Figure 4:
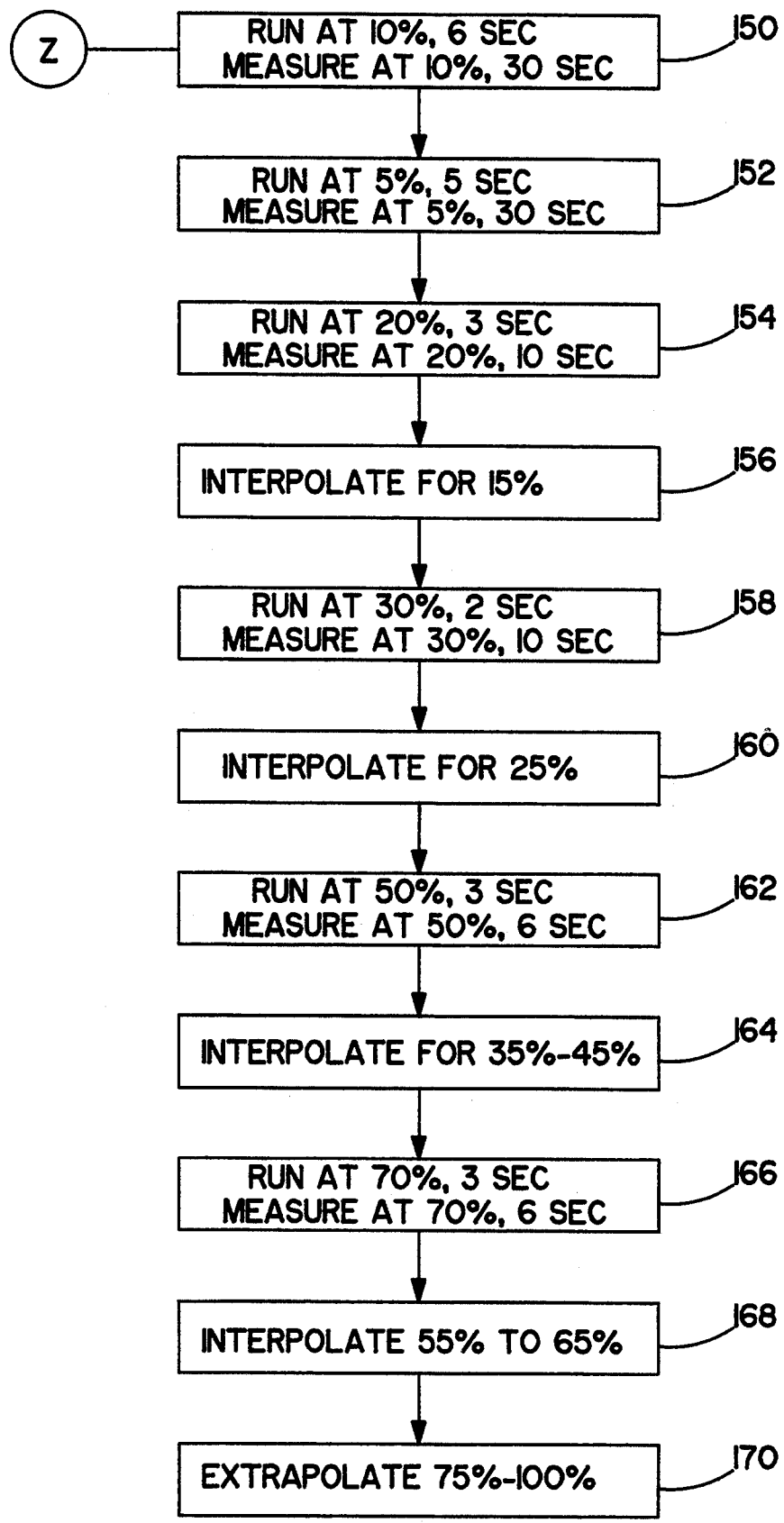
FIG. 4 is a flow chart of the process for calibrating the system shown in FIG. 1.

FIG. 4 is a flow chart showing the operation of calibration function 24 (shown in FIG. 1). Execution of the calibration is chosen at the operator's discretion. Preferably, the operator executes the calibration function when the apparatus 2 is commissioned, each time a new type of material is placed in hopper 32, and each time any mechanical change is made. Prior to commissioning, a default vibratory curve array yp is used, and the reliability array values are all set to 0.

At step 150, the actuator is set at 10% of the maximum drive command. In the exemplary embodiment, this corresponds to a frequency of 1000 Hertz. Below this frequency, the material may not start to flow. By starting the calibration at 10% drive command, the vibratory feed tray 34 is filled, and some of the cohesion of the material is overcome. The flow is allowed to stabilize for 6 seconds before the actual calibration data are collected. The loss in weight is then measured over a 30 second period, to determine the average discharge rate at 10% drive command.

At step 152, the motor speed is then reduced to 5% drive command (i.e., 500 Hertz). The flow is allowed to stabilized for 5 seconds and the loss in weight over the subsequent 30 seconds is measured, to determine the average discharge rate at 5% drive command.

At step 154, the motor speed is increased to 20% drive command, or 2000 Hertz. The flow is allowed to stabilize for 3 seconds, and the loss in weight during the subsequent 10 seconds is measured, to determine the average discharge rate at 5% drive command. Rather than measuring loss in weight at 15%, at step 156 a predicted discharge rate 20c, or yp(2), is approximated using linear interpolation between the rate at 10% and the rate at 20%.

At step 158, the motor speed is then increased to 30% drive command, or 3000 Hertz. The flow is allowed to stabilize for 2 seconds, and the loss in weight during the subsequent 10 seconds is measured, to determine the average discharge rate at 30% drive command. At step 160, a predicted discharge rate 20e, or yp(4), is approximated using linear interpolation between the rate at 20% and the rate at 30%.

As the percentage of maximum drive command increases, the period during which the loss in weight is measured is reduced. This is done for convenience, so that a large amount of material is not discharged during the calibration sequence. The LWF 2 is part of a production system, and it is, at best, an inconvenience to discharge the material into the other production equipment. For the same reason, fewer weight loss estimates are collected at the higher drive command levels, and more predicted discharge rates 20a-20t are approximated using linear interpolation or extrapolation.

At step 162, the motor speed is then increased to 50% drive command, or 5000 Hertz. The flow is allowed to stabilize for 3 seconds, and the loss in weight during the subsequent 6 seconds is measured, to determine the average discharge rate at 50% drive command. At step 164, predicted discharge rates 20g-20i, or yp(6)-yp(8) are approximated using linear interpolation between the rate at 30% and the rate at 50%.

At step 166, the motor speed is then increased to 70% drive command, or 7000 Hertz. The flow is allowed to stabilize for 3 seconds, and the loss in weight during the subsequent 6 seconds is measured, to determine the average discharge rate at 70% drive command. At step 168, predicted discharge rates 20k-20m, or yp(10)-yp(12), are approximated using linear interpolation between the rate at 50% and the rate at 70%. At step 170, predicted discharge rates 20o-20t, or yp(14)-yp(19) are approximated using linear extrapolation based on the rate at 50% and the rate at 70%. The calibration is now complete and the calibration data replace the default values in vibratory curve array yp.

One skilled in the art understands that the selection of which drive command values to measure and which values to interpolate during the calibration is based on the general shape of the vibratory curve 20. Linear interpolation is used because higher order polynomial regression techniques may yield a regression curve that fits the measured points but varies widely from the non-measured points, particularly the points at the higher drive command values. Furthermore, polynomial regression requires more processor time to perform.

Referring again to FIG. 2, another effect of the linear extrapolation between 70% and 100% is shown. The actual discharge rate function near the maximum drive command is shown in phantom in curve 21. The extrapolated predicted discharge rates 20p-20t, or yp(15)-yp(19), are greater than the actual rates. This biases the system to select lower drive commands and undershoot the setpoint, rather than overshoot, which is desirable in many manufacturing situations, as described earlier.

Referring again to FIG. 2, at the completion of the calibration operation, the reliability array yp_rel values are set to the values of points 22a-22t shown in curve 22. The predicted discharge rates 20a-20f between 0 and 30% drive command have the highest reliability valued 80%. More measurements are taken in this drive command range, and the duration of each measurement is the longest. Similarly the reliability is lowest (30%) between 90% and 100% drive command, with no measurements taken in that range during calibration.

Figure 5:
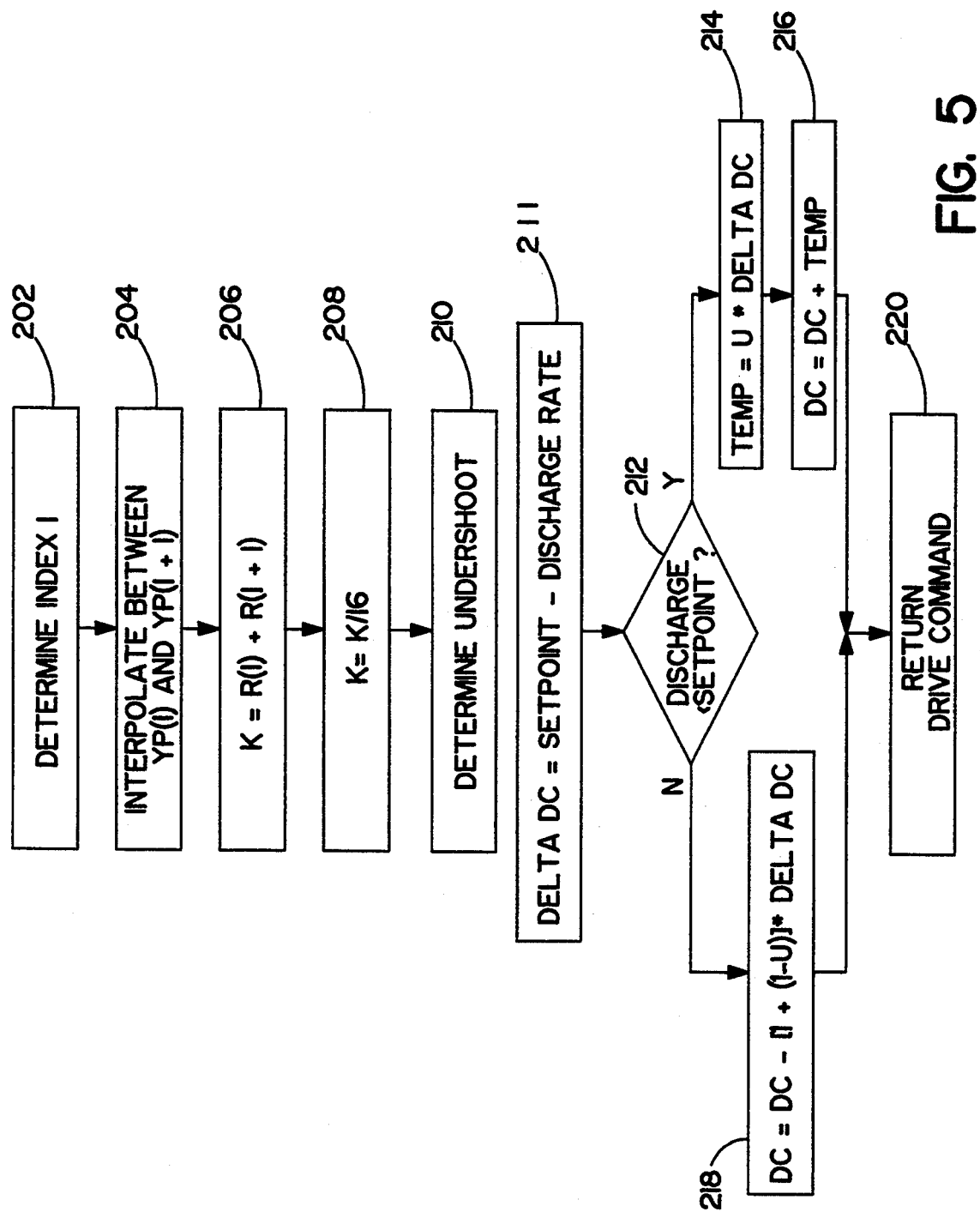
FIG. 5 is a flow chart of the process for determining the drive command to use to drive the vibratory feeder shown in FIG. 1.

The operation of Kalman filter 14, as described above with reference to FIG. 3, is generally independent of the reliability array during steady state operations. However, immediately after startup or a setpoint change, the drive command selected by the Kalman filter 14 is modified before the drive command is sent to the vibratory drive power electronics 30. FIG. 5 shows how the vibratory curve 20 of predicted discharge rates and the reliability array 22 are used to select the motor speed immediately after startup.

Referring to FIG. 5, at step 202, the index I for the current setpoint discharge rate is determined. I is the index of the largest predicted discharge rate 20a-20t, or yp(0)-yp(19), that is less than or equal to the setpoint. I+1 is the index of the smallest predicted discharge rate 20a-20t, or yp(0)-yp(19), that is greater than the setpoint. At step 204, a preliminary drive command value is then calculated by linear interpolation between the lower predicted discharge rate yp(I) and the next greater predicted discharge rate yp(I+1). Thus, an interpolated drive command value associated with the predicted discharge rate that is substantially equal to the setpoint discharge rate is selected.

At step 206; the reliability factors yp_rel(I) and yp_rel(I+1) associated with the respective drive command values yp(i) and yp(I+1) are added to form a sum K, that ranges from 0 to 200. At step 208, the sum K is divided by 16, forming a quotient K, which is rounded down to the next lowest integer between 0 and 12, inclusive. At step 210, an undershoot factor U is then selected by a table look up. The possible values of K and U are listed in Table 1.

TABLE 1

| Undershoot Factor, U | |
|---|---|
| K | U |
| 12 | 0.99 |
| 11 | 0.97 |
| 10 | 0.95 |
| 9 | 0.93 |
| 8 | 0.91 |
| 7 | 0.89 |
| 6 | 0.87 |
| 5 | 0.85 |
| less than 5 | 0.80 |

At step 211, the difference (DELTA DC) between the setpoint and the interpolated drive command value is determined. At decision step 212, if the current discharge rate is below the setpoint, then at step 214, the difference DELTA DC is multiplied by the undershoot factor U, forming a product TEMP that is less than the difference DELTA DC. At step 216, the product TEMP is added to the current drive command. If, at decision step 212, the current discharge rate is above the setpoint, then at step 218 the drive command is reduced by an amount that is greater than the difference DELTA DC by a factor of $[1+(1-U)]$.

Thus, regardless of whether the current discharge rate (as estimated by Kalman filter 14) is less than or greater than the setpoint, the drive command is modified so that the resulting discharge rate is less than the setpoint. The drive command value is thus reduced according to the respective reliability factor associated with the selected drive command value, forming a reduced drive command value X. At step 220, the reduced drive command value is returned. A drive command signal representing the reduced drive command value is transmitted to the actuator, setting the discharge rate.

Figure 6:
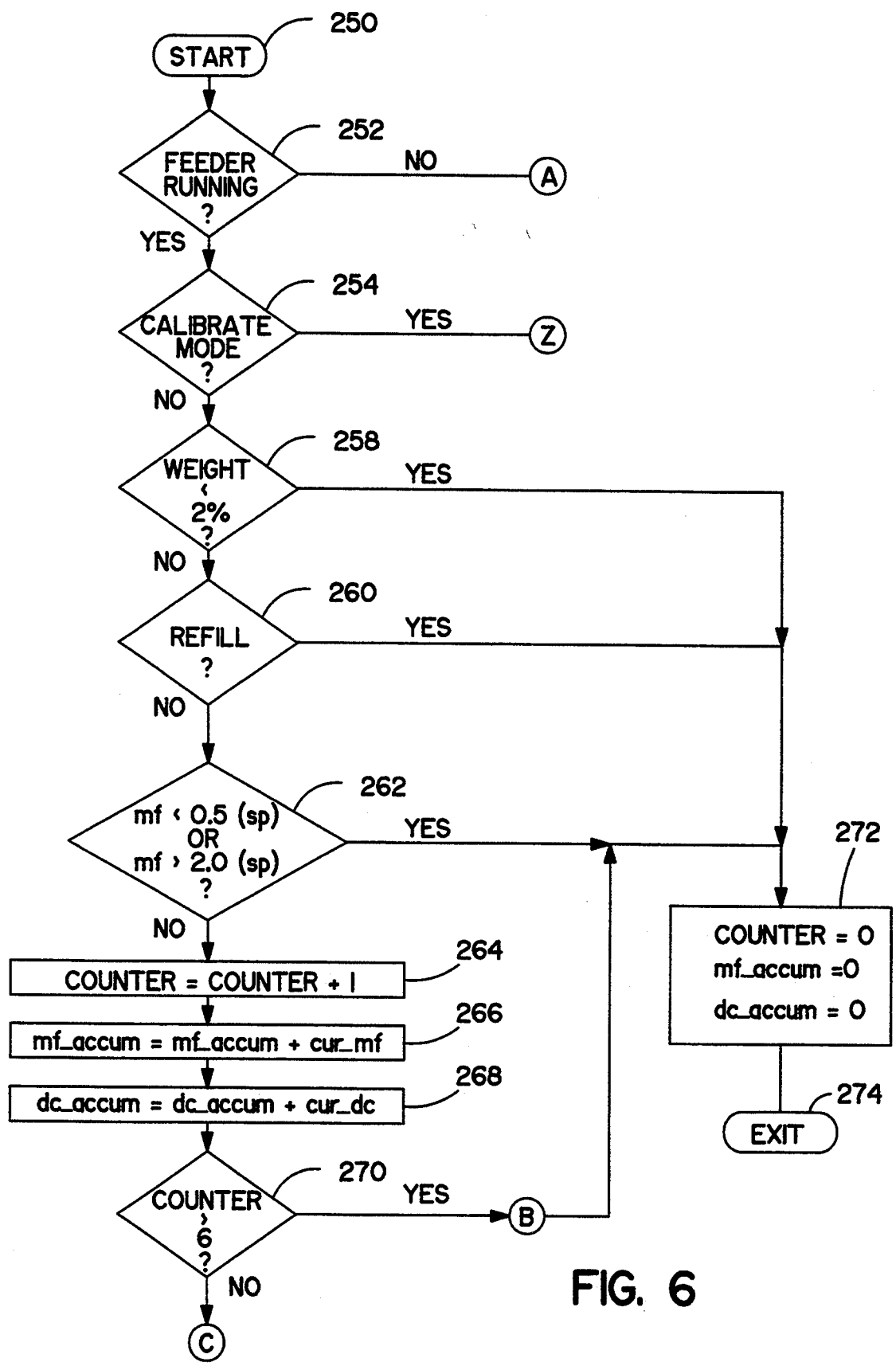
FIG. 6 is a flow chart of the process for determining whether to update the vibratory curve shown in FIG. 2.
Figure 11:
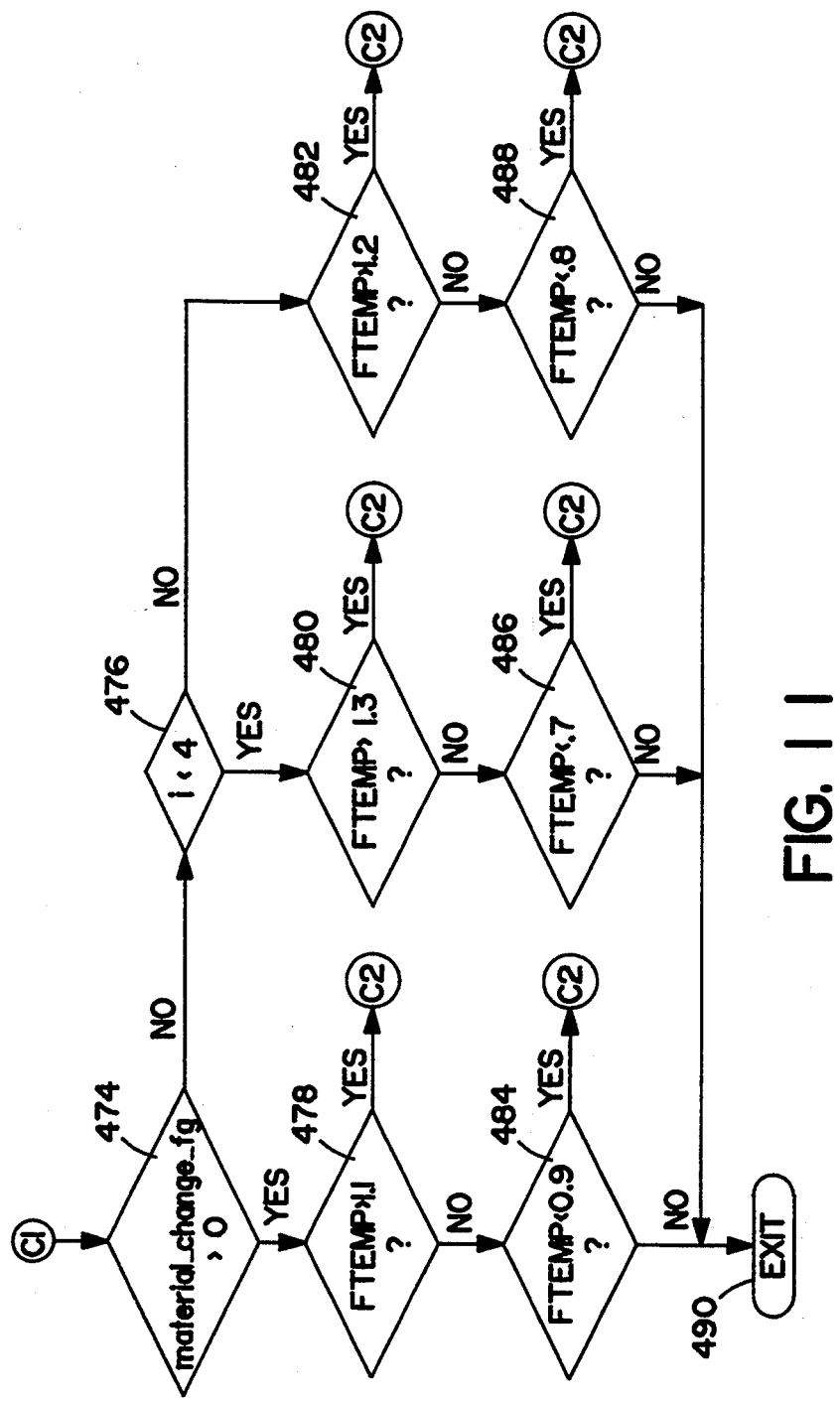

FIG. 6 is a flow chart of the process 18 (shown in FIG. 1) that updates the vibratory curve and reliability array. At step 250, the loop begins. At decision step 252, a check is made to determine whether the feeder is currently running. If not (i.e., if hopper 32 has run out of material), control is transferred to step A, as shown in FIG. 11. Referring again to FIG. 6, if the feeder is runnings control is passed to decision step 254. At decision step 256, a check is made to determine whether the LWF 2 is being operated in the calibrate mode. If so, then the sequence described above with reference to FIG. 4 is executed. If at step 254 of FIG. 6, the LWF is not in calibration mode, then the net weight in weigh hopper 32 (shown in FIG. 1) is compared to its maximum net weight. If the net weight is below 2% of the maximum, then the operator may be emptying the feeder, or the storage hopper (not shown) that feeds weigh hopper 32 is not functioning properly and the operator intervention is required. In this cases control is transferred to step 272, in which the counter and accumulators are set to zero and the update loop ends at step 274. Curves 20 and 22 are not updated.

If, at step 258, weigh hopper 32 contains more than 2% of its maximum net weight, then control is passed to decision step 260. At step 260, a check is made to determine whether the storage hopper (not shown) is filling weigh hopper 32. During the refill, normal loss-in-weight operation is not occurring. If a refill is detected, control also passes to step 272, zeroing the accumulators and counter and ending the loop. Curves 20 (yp) and 22 (yp_rel) are not updated.

If there is no refill detected at step 260, a check is made to determine whether the mass flow (discharge) rate MF differs from the setpoint by more than 50% (i.e., whether MF is less than half of the setpoint or more than twice the setpoint). Curves 20 (yp) and 22 (yp_rel) are not updated. In this case, LWF 2 may be operating properly, but the MF is so far from steady state that it is changing rapidly, and the reliability factor for any estimate of MF is low.

If, at step 262, the lesser of the MF and setpoint values is more than 50% of the greater of the two values, control is passed to step 264. At step 264, a counter is incremented, to count the number of weight and drive command readings. At step 266, the mass flow accumulator is incremented by the current measure of loss in weight in hopper 32. At step 268, the drive command accumulator is incremented by the current value of the drive command.

At step 270, the counter is checked to determine whether the control loop has been executed 7 times. If so, then it is time to update the vibratory curve array 20 (yp) and reliability array 22 (yp_rel). Control is passed to step B as described below with reference to FIGS. 7 and 8. If the counter is not greater than 6, then control is passed to step C as described below with reference to FIG. 9.

Figure 7:
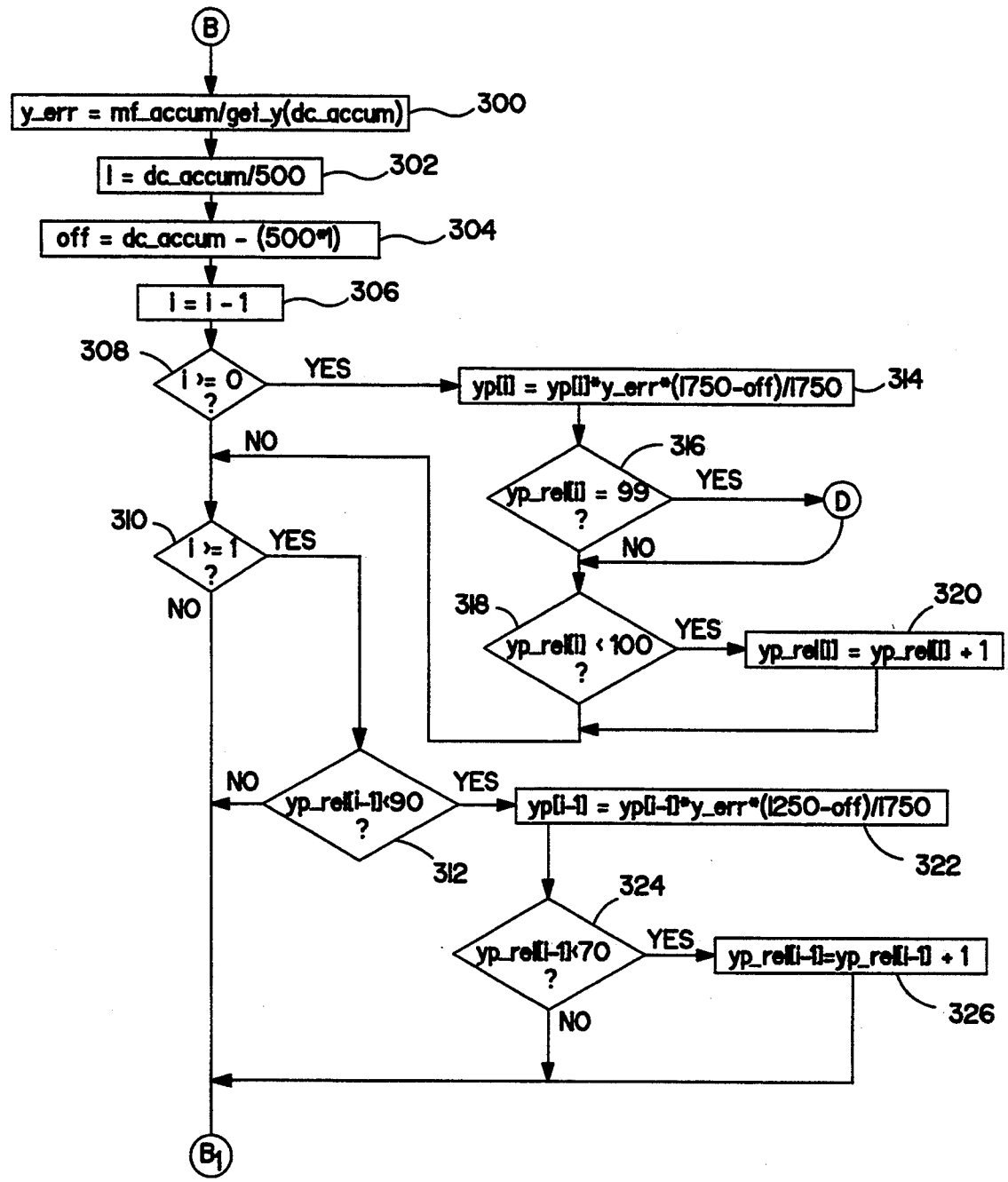
FIGS. 7 and 8 are flow charts of the process for updating individual values in the vibratory curve and reliability array shown in FIG. 1.
Figure 8:
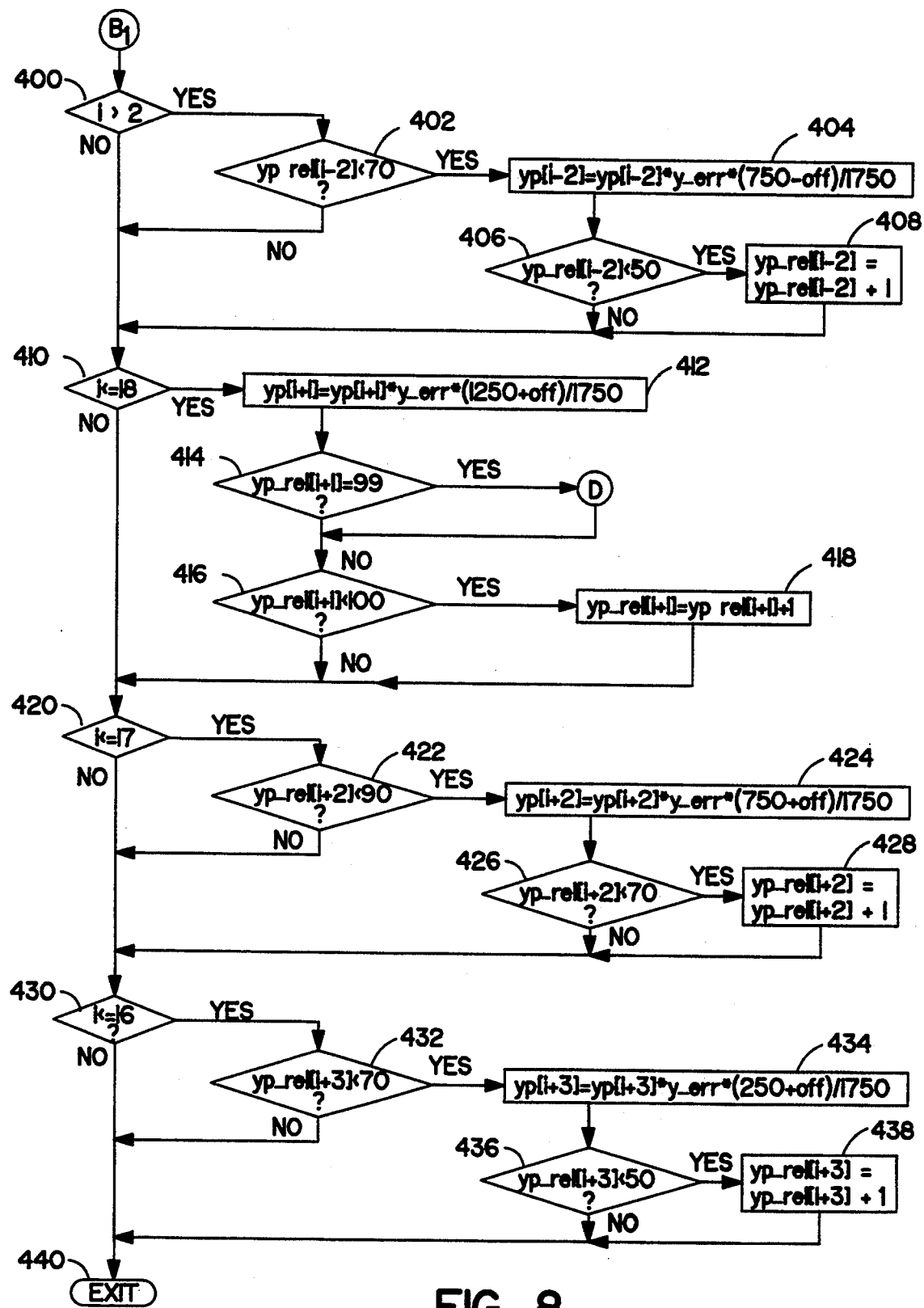

FIGS. 7 and 8 are flow charts of the process for updating the yp and yp_rel arrays. Up to six vibratory curve points are updated (three below the current drive command and three above the drive command). At step 300 of FIG. 7, after the seventh iteration of the control loop shown in FIG. 6, the fractional error (y_err) in the predicted mass flow rate is calculated. The average discharge rate loss in weight (mf_accum) is divided by the average predicted discharge rate as indicated from the vibratory curve array (yp) for the drive command (dc_accum). At step 302, the index of the average drive command in the accumulator (dc_accum) is determined, by dividing the frequency of the drive command by 500 (In the exemplary embodiment, successive drive command values in the vibratory curve array yp are equally spaced 500 Hertz apart), and rounding down to the next lowest integer. At step 304, the offset (off) between the average drive command value in the accumulator and the frequency of the nearest lower frequency in the vibratory curve is determined. At step 306, the index i is reduced by one to match the indexing convention of the C programming language (The first index in an array is zero in C).

At decision step 308, a determination is made whether the corrected index is still within the range greater than or equal to zero (i.e., the vibratory frequency is greater than or equal to 500 Hertz). If so, at step 314, the nearest lower vibratory curve value 20(i) (referred to as yp[i] in FIG. 7) is adjusted according to equation (1).

$$yp[i] = yp[i] * y\_err * (1750 - off)/1750 \quad (1)$$

where:
  yp[i] = the nearest lower vibratory curve value;
  y_err = relative error between actual discharge rate and predicted rate; and
  off = offset between next lowest curve value and the setpoint.

If the frequency is less than 500, then control is passed to step B1 (discussed with reference to FIG. 8).

If the current drive command value is close to an even multiple of 500, the current actual discharge rate is a more "reliable" indicator of what the discharge rate would be at a drive command that is an even multiple of 500. Conversely, if the current drive command value is far from an even multiple of 500, the current actual discharge rate is a less reliable indicator of what the discharge rate would be at a drive command that is an even multiple of 500. Thus, according to equation (1), when the vibratory curve 20 (or yp[i]) is updated, the adjustment is reduced when there is a large offset between the current drive command and the next lower multiple of 500 Hertz. The predicted discharge rate in the vibratory curve 20 is only updated to match the measured discharge rate exactly when the current discharge rate is an even multiple of 500.

Next the reliability 22(i) (yp_rel in FIG. 7) of the next lowest predicted discharge rate in array 20 is increased. At step 316, a check is made to determine whether the reliability is equal to 99% for the nearest lower predicted discharge rate in vibratory curve 20. If so, a snapshot of the vibratory curve 20 and reliability array 22 is taken in step D (discussed below with reference to FIG. 9). If the reliability is not equal to 99 then decision step 318 is executed. At step 318, if the reliability is less than 100%, then step 320 is executed, and the reliability is increased by 1. Thus, if the setpoint remains unchanged, and environmental factors remain constant, the reliability of the predicted discharge rate can increase every 7 to 20 seconds.

At step 310, a check is made whether the current drive command is greater than or equal to 1000 Hertz (i.e., the index is at least 1). If so, at decision step 312 a further check is performed to determine whether the reliability (yp_rel[i−1]) of the next lower predicted discharge rate (yp[i−1]) in array 20 is less than 90%. If so, then the next lower predicted discharge rate is adjusted at step 322, according to equation (2).

$$yp[i-1] = yp[i-1] * y\_err * (1250 - off)/1750 \quad (2)$$

Although the form of equation (2) is similar to equation (1), the second lower predicted discharge rate is adjusted by a smaller amount, because the current actual discharge rate is less reliable for predicting the second lower discharge rate than for predicting the first lower discharge rate.

After step 322, decision step 324 determines whether the reliability (yp_rel[i−1]) of the second lower discharge rate (yp[i−1]) is below 70. If so, then at step 326, the reliability of the second lower predicted discharge rate is increased by one. If (yp_rel[i−1]) is greater than or equal to 70 at step 324, then it is not increased.

Control is then passed to step B1, shown in FIG. 8. Referring now to FIG. 8, at step 400, if the index is greater than 2 (the frequency is greater than 1500 Hertz), and the reliability (yp_rel [i−2]) of the third lower predicted discharge rate (yp[i−2]) is less than 70, then at step 404, the third lower predicted discharge rate is adjusted according to equation (3).

$$yp[i-2] = yp[i-2] * y\_err * (750 - \text{off})/1750 \quad (3)$$

The third lower predicted discharge rate (yp[i−2]) is adjusted by a smaller fractional amount than the closer predicted rates, because the current actual discharge rate is less reliable for predicting the third lower discharge rate than for predicting the second lower discharge rate.

At step 406, a check is made whether the reliability (yp_rel[i−2]) of the third lower discharge rate is below 50. If sod then at step 408, the reliability of the third lower discharge rate is increased by one.

The remainder of FIG. 8 performs similar updates to the first three vibratory curve values 20b–20t. above the current discharge rate, and to the three respective reliability factors 22b–22t for those vibratory curve values. As with the predicted drive command values below the setpoint, the values that are further from the current setpoint are not updated as much as the nearer values.

At decision step 410, a check is made whether the current drive command is less than the maximum drive command (i.e., index <=18). If so, then at step 412, the next higher drive command yp[i+1] is adjusted according to equation (4).

$$yp[i+1] = yp[i+1] * y\_err * (1250 + \text{off})/1750 \quad (4)$$

Then the reliability (yp_rel[i+1]) is increased, if less than 100. At step 414, if the reliability is equal to 99, then control passes to step D (shown in FIG. 9). Otherwise, if at step 416 the reliability is less than 100, then at step 418 the reliability is increased by 1.

At step 420, if the current drive command is less than 9500 Hertz (index <=17) then the second higher predicted discharge rate yp[i+2] may be updated. If at step 422, the reliability yp_rel[i+2] is less than 90, then, at step 424, the second higher vibratory curve predicted discharge rate is adjusted according to equation (5).

$$yp[i+2] = yp[i+2] * y\_err * (750 + \text{off})/1750 \quad (5)$$

If at step 426, the reliability of yp[i+2] is less than 70, then at step 428 the reliability is increased by 1.

At step 430, a check is made whether the current drive command is less than 9000 Hertz (index <=16). If so, then the third higher predicted discharge rate yp[i+3] may be updated. If at step 432, the reliability yp_rel[i+3] is less than 70, then, at step 434, the third higher vibratory curve predicted discharge rate is adjusted according to equation (6).

$$yp[i+3] = yp[i+3] * y\_err * (250 + \text{off})/1750 \quad (6)$$

At step 436, the reliability is less than 50, then the reliability or the third greater predicted discharge rate is increased by 1.

In a variation of the embodiment shown in FIGS. 7 and 8, the reliability factors are increased more at steps 318, 324, 406, 416, 426 and 436 if the reliability is less than 50%. As shown in the appendix, at steps 316 and 416, the reliability is increased by 3 if it is below 50%. At steps 324, 404, 426 and 436, the reliability is increased by 2 if it is below 50%.

Figure 9:
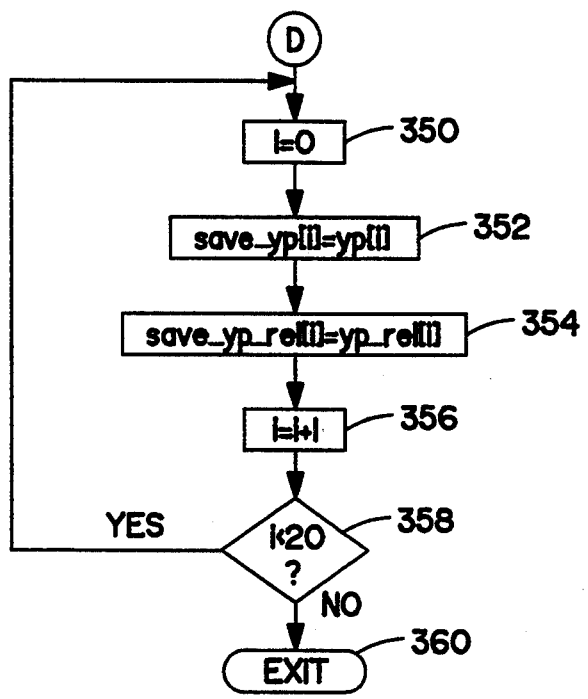
FIG. 9 is a flow chart of the process for saving a snapshot of the current values of the vibratory curve and reliability array shown in FIG. 1.

FIG. 9 is a flow chart showing the process of updating the reliability for a predicted discharge rate if the reliability of that predicted discharge rate is changing from 99% to 100%. Steps 352 to 358 are repeated for each predicted discharge rate 20a–20t in the vibratory curve array 20. A "snapshot" of the vibratory curve is taken at the time that the reliability is increased to 100%. At step 352, a predicted discharge rate is stored into a snapshot (save_yp) array. At step 354 the reliability is increased to 100%.

The snapshot (save_yp) array is used to "rescale" the predicted discharge rate curve if the actual discharge rate varies substantially from the predicted discharge rate. This could occur if, for example, a mechanical change is made, or if a new material is poured into hopper 32 without making any adjustments to the setup data in the system. The system includes means for detecting such variations, as described now with reference to FIGS. 10 and 11.

Figure 10:
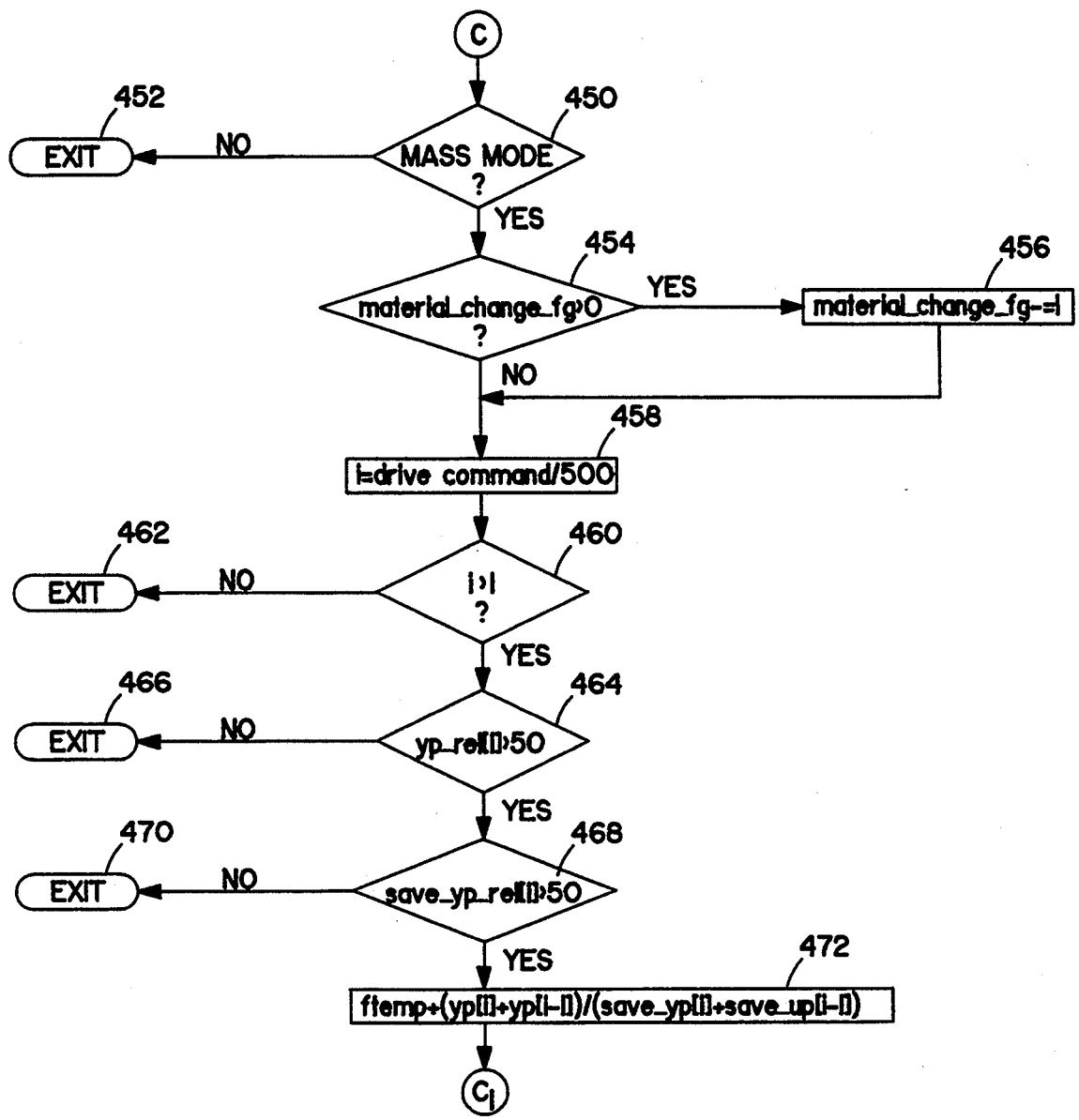
FIGS. 10 and 11 are flow charts for the process of determining whether to rescale the vibratory curve and reliability array shown in FIG. 1.

In FIG. 10, control is passed to step C if the system completes the steps shown in FIG. 6 anywhere between 1 and 6 times (The updates to curves 20 and 22 as shown in FIGS. 7 and 8 are performed after the seventh iteration). At step 450, a check is made to determine whether the feeder is operating in mass mode (i.e., loss in weight) or volumetric. For mass mode, a check is made at step 454 to determine whether the material change flag (material_change_fg) is greater than 0. If the material change flag is greater than 0, then it is decremented by 1.

Ordinarily the material change flag is equal to zero. If the net weight of the material in hopper 32 decreases below 2% of its maximum and the feeder is stopped, then the material change flag is set to 255. Thus, during normal cycling through the steps of FIGS. 6 and 10, the flag will again reach 0 after 255 iterations, typically about 5 minutes. The material change flag is used as a factor in determining whether to rescale the vibratory curve, as explained below with reference to FIG. 11.

At step 458, the index of the vibratory curve array 20 is determined, as the largest integer value less than the frequency divided by 500 Hertz. At step 460, if the index is zero or one (less than 1500 Hertz), the loop is completed at step 462. If the index is greater than one at step 460, then control passes to decision step 464. At step 464, if the reliability of the current predicted discharge rate is less than 50, then the loop is completed at step 470. In other words, if the predicted discharge rate is not deemed reliables then the curve is not rescaled.

If at step 468, the reliability is greater than 50%, then control passes to step 472; otherwise the loop ends at step 470. At step 472, the ratio (ftemp) of the sum of the nearest predicted discharge rates (one above and one below the current rate) to the sum of the respective "snapshot" values for the same indices is computed. Because the predicted discharge rates are updated every seventh cycles this ratio (ftemp) is a measure of the change in the discharge rate (for a given drive command) since the reliability was determined to be very high (i.e., 100%). Although the predicted discharge rate for the current drive command may be reliable, if it has varied considerably since the system started up (or since the last time that the curve was rescaled), then the vibratory curve predicted discharge rates for frequencies far away from the current drive command are very unreliable. That is, for those frequencies more than 1500 Hertz away. In order to make the curve more accurate, the curve is rescaled. To rescale the curves the snapshot values are all multiplied by the ratio ftemp, as discussed with reference to FIG. 12.

Referring now to FIG. 11, a flow chart of the process for determining whether to rescale is shown. At step 474, the material change flag is checked. If the material change flag is greater than zero (a new type of material was placed in hopper 32), then the threshold variation is lowered and control passes to steps 478 and 484. At steps 478 and 484, if the ratio ftemp varies from unity by more than 10%, then control is passed to step C2 (FIG. 12) to rescale the curve. This is due to the known probability that the vibratory curve 20 changes when the type of material is changed.

Referring again to FIG. 11, if at step 474, the material change flag is zero, then the threshold variation is higher. If the drive command is less than 25%, then the threshold is highest, and at steps 480 and 486, the ratio ftemp may deviate from unity by up to 30% in either direction without control being passed to step C2 to rescale the curve. If, at step 476, the drive command is 25% or more, then the threshold is in the middle. The ratio ftemp may vary from unity by up to 20% at steps 482 and 488, without control being passed to step C2 to rescale the curve. If the ratio ftemp is within the threshold value, then the loop is exited at step 490.

Figure 12:
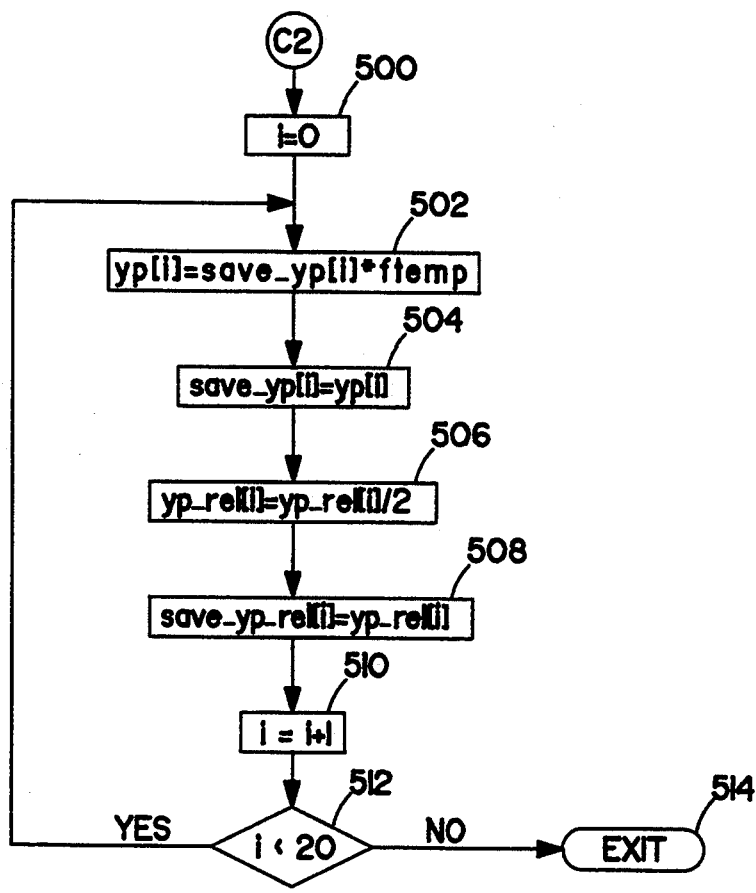
FIG. 12 is a flow chart of the process for automatically rescaling the vibratory curve and reliability array shown in FIG. 1.

FIG. 12 is a flow chart of the process of rescaling the vibratory curve 20a–20t, and the reliability array 22a–22t. Steps 502 through 508 are repeated for each drive command value in the vibratory curve 20 and the reliability array 22. At step 502, the predicted discharge rate is multiplied by the ratio ftemp. At step 504, the snapshot predicted discharge rate is also set to the same value as the predicted discharge rate. At step 506, the reliability of every predicted discharge rate is reduced by 50%. At step 508, the new reliability array is stored in a snapshot reliability array.

Figure 13:
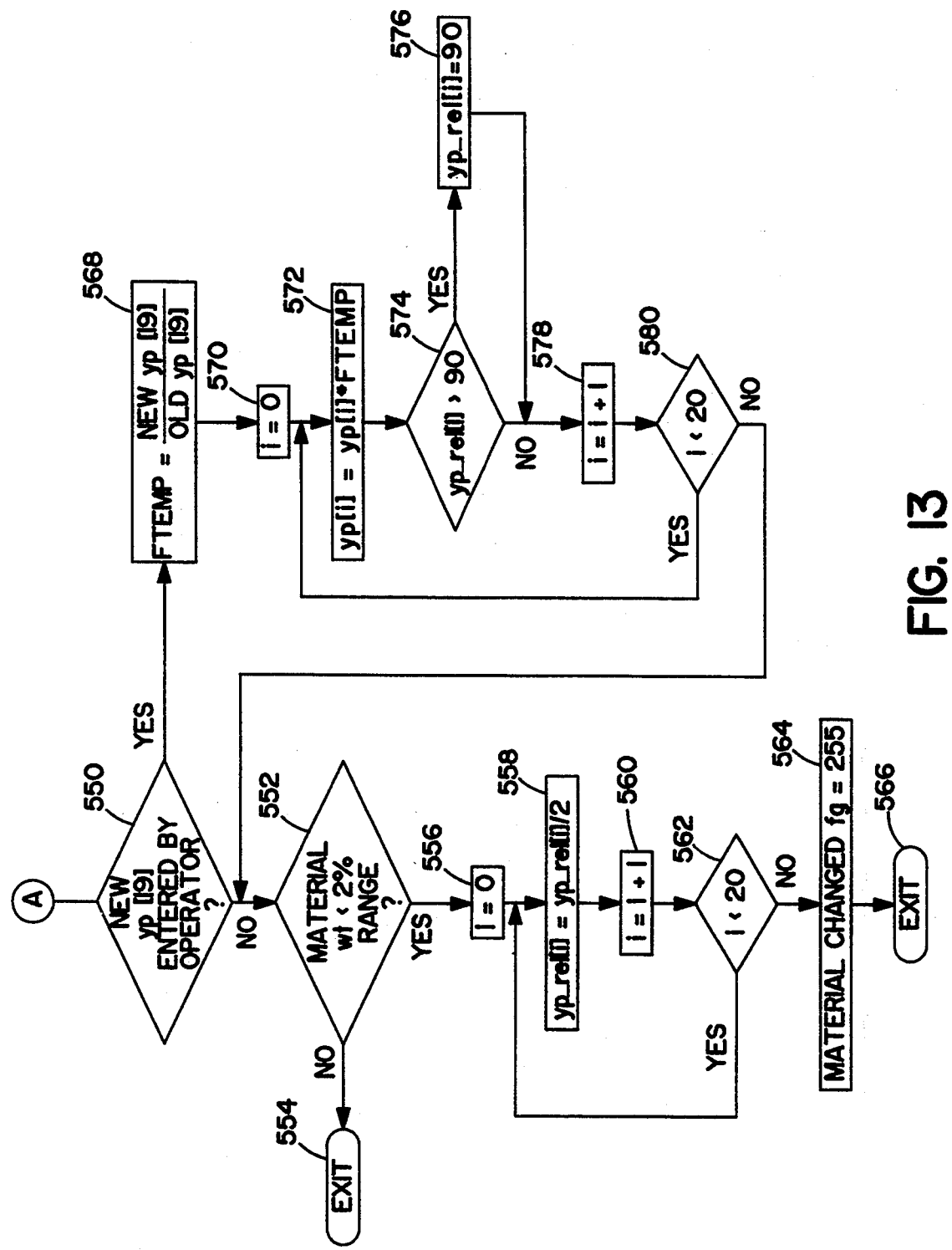
FIG. 13 is a flow chart showing an a process for rescaling the vibratory curve shown in FIG. 1, under operator direction.

FIG. 13 is a flow chart showing the process that is executed if the feeder stops running, as mentioned above with reference to FIG. 6. At step 550, a check is made to determine whether the operator has entered a new maximum predicted discharge rate. Ordinarily, the operator enters a new maximum discharge rate when a new material is being fed into hopper 32. Preferably, the operator is provided a table including the appropriate maximum discharge rate for each material that will be fed into the system 2. If, at step 550, the operator enters the new maximum rate, then at step 568, a ratio ftemp is computed by dividing the old maximum discharge rate by the new maximum discharge rate. This is a second type of scenario in which the vibratory curve is rescaled. As shown in steps 570 through 580, each predicted discharge rate 20a–20t and each reliability factor 22a–22t is updated. At step 572, the predicted discharge rate is multiplied by the ratio ftemp. At step 574, a check is made to determine whether the reliability of the predicted discharge rate is greater than 90. If so, then at step 576, the reliability is reduced to 90.

When the vibratory curve 20 and the reliability array 22 are updated, control is passed to step 552. Control is also passed to step 552 from step 550 if the operator has not entered a new maximum rate.

At step 552, a check is made to determine whether the hopper 32 is less than 2% full. If it is more than 2% full, the loop is exited at step 554. If hopper 32 is less than 2% full, then at steps 556 through 562, every reliability factor 22a–22t in reliability array 22 is reduced by 50%, and at step 564, the material flag is set to 255.

Figure 14:
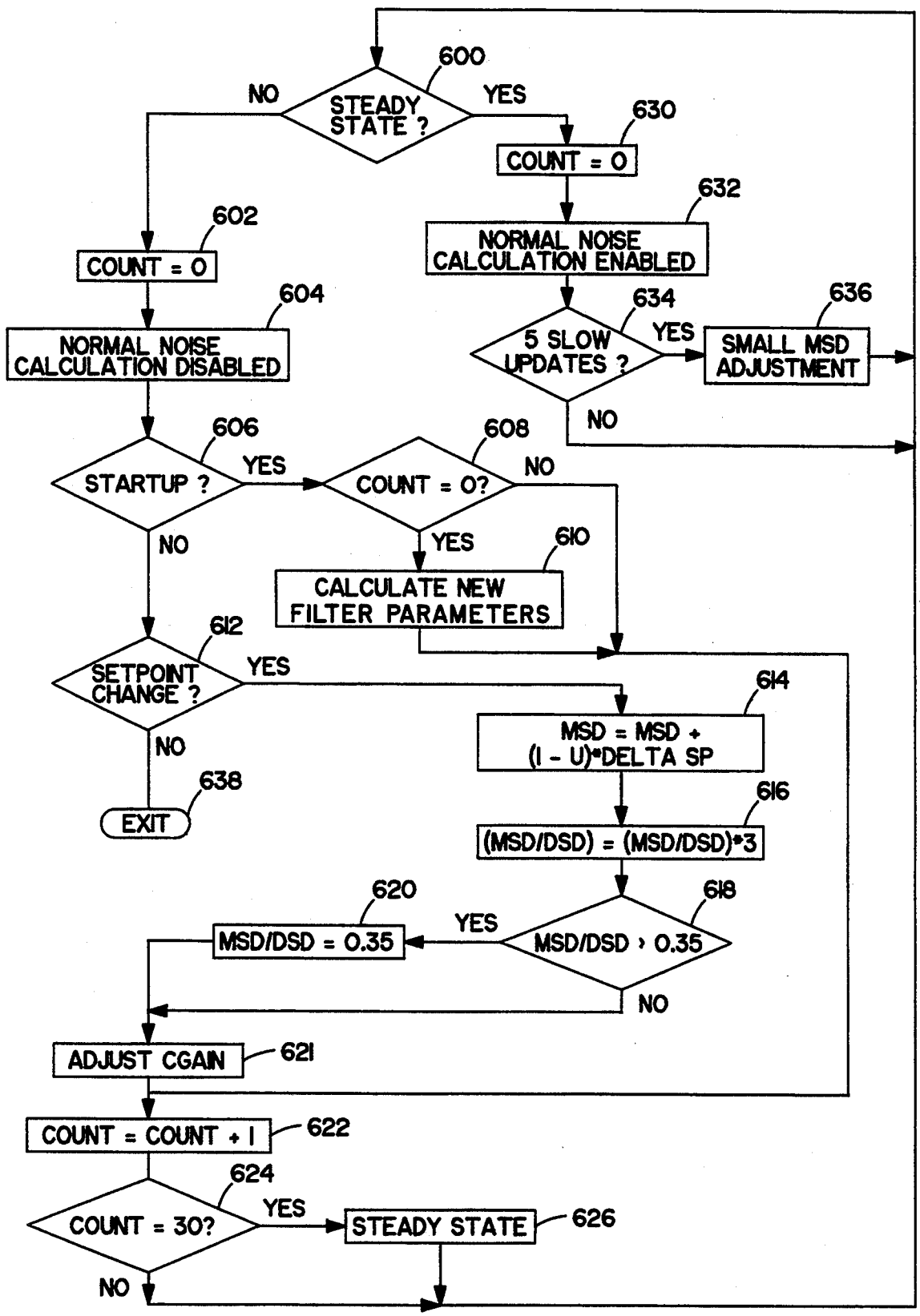
FIG. 14 is a flow chart showing the process for adjusting parameters of the Kalman filter shown in FIG. 1, to accommodate system start up and setpoint changes.

FIG. 14 is a flow chart showing an additional aspect of the invention. One of the features of Kalman filter 14 (shown in FIG. 1) is the function of according different weights to the weight data received from scale 38 (while estimating the actual discharge rate), depending on the recent history. The software for the filter is provided in the appendix, and the basic functions of the filter are described an great detail in U.S. Pat. No. 4,954,975 to Kalata, as referenced above.

Kalman filter 14 determines an estimated discharge rate, and the standard deviation of the estimated discharge rate. If a new measurement is received that differs by a large amount (for example, a discharge rate that is more than three standard deviations from the expected rate), then Kalman filter "perturbates". As defined herein, perturbates means that filter 14 accords a much smaller weight to the new measurement relative to the previous measurements. This is desirable when the LWF 2 is operating in steady state, and a spurious error occurs (e.g., environmental noise corrupts a weight measurement sent to filter 14). By reducing the weight accorded to the spurious value, filter 14 maintains steady flow.

If, however, the system is just starting ups or the setpoint is changed by a large amounts then each value is expected to differ from the previous values. According to the aspect of the invention shown in FIG. 14, when the system starts up or there is a setpoint change, parameters are adjusted to temporarily intervene to prevent filter 14 from perturbating, to make the filter more responsive to changing weight estimates.

Referring now to FIG. 14, at step 600, the system status is checked to determine whether LWF 2 is in steady state. If nots then control passes to step 602. A counter is set to zero. At step 604 the normal noise calculation sequence of filter 14 is disabled. At step 606, the system determines whether LWF 2 has just started up. If the system has just started up, then control passes to step 608. At step 608, the counter is checked to determine whether this is the first cycle through this loop. For the startup scenarios a set of filter parameters is adjusted the first time through, at step 610. For later iterations, control passes directly to step 622, where the counter is incremented by 1. At step 624, the counter is checked to determine whether it equals 30. When the counter reaches 30, (i.e., 30 weight measurements have been collected, then the system state is changed from startup to steady state.

If, at step 606, the system has not just started up, control passes to decision step 612. At step 612, if it is determined that the setpoint has just changed, then control passes to steps 614 through 620. At step 614, the measured standard deviation (MSD) of the estimated discharge rate formed by filter 14 is adjusted, according to equation (7).

$$MSD = MSD + (1 - U) * \text{DELTA SETPOINT} \quad (7)$$

where:
MSD = measured standard deviation
U = Undershoot code (from Table 1)
DELTA SETPOINT = fractional change in setpoint In the software listing in the appendix, MSD is referred to as "mfsetp.nsig". Because filter 14 determines whether to perturbate (reduce the weight accorded the new estimate) based on the standard deviation, an increased standard deviation causes filter 14 to respond as though the new value is nearer to the previous estimates. The increase is primarily determined from the fractional change in the setpoint. Thus, the more the setpoint changes, the greater the adjustment to filter 14 to accept discharge rate estimates that vary from previous estimates. The undershoot code (U) from Table 1 is also used to modulate the adjustment. The undershoot code is derived from the reliability factor, and the greater the reliability, the smaller the value of $(1-U)$. Thus, if the current predicted discharge rate is more reliable, the adjustment to the MSD is smaller.

At step 616, the desired standard deviation (DSD) parameter in filter 14 is adjusted to produce a desired MSD/DSD ratio. The ratio of MSD/DSD determines how much filtering is done by Kalman filter 14. The DSD is smaller than the MSD, because the output of filter 14 is smoother than the input. The larger the ratio of MSD/DSD, the more filtering is performed. Also, the larger the ratio, the longer the time constant of filter 14. After the adjustment, the ratio of MSD/DSD is three times less than the value it had prior to the filter adjustment. This is because, when the reliability of the predicted discharge rate (yp) is low, it is desirable for filter 14 to respond three times as quickly to update the estimated weight quickly, allowing a rapid correction. In the software listing in the appendix, DSD is referred to as "mfsetp.vdsig". At steps 618 and 620, the ratio MSD/DSD is clamped to limit it to a minimum value.

At step 621, the CGAIN parameter is adjusted. The motor speed control function 16 (shown in FIG. 1) uses a PID algorithm (proportional integral derivative) to adjust the flow rate. The CGAIN parameter is the gain of the integral component of the control algorithm. Thus, changes to CGAIN influence the "time constant" of motor speed control 16 by adjusting the response to the massflow error signal it receives from filter 14. CGAIN is referred to in the software appendix as "mfsetp.cgain". The increase in the CGAIN parameter is proportional to $[(1-U) * (\text{setpoint change})]$, where U is the undershoot function of Table 1. Thus if the predicted discharge rate is unreliable, the motor speed control 16 is adjusted to more aggressively correct for inaccurate feeding while responding to the setpoint change.

At step 622 through 626, the count is incremented and the count value is checked, to determine whether the LWF 2 is now in steady state, as described above. Thus, by adjusting the MSD and DSD, perturbation is prevented. By adjusting CGAIN, the responsiveness of the filter to changing discharge rate is adjusted. Control is now passed to step 600 to repeat the loop.

At step 600, if LWF 2 is in steady state, then control passes to step 630, where the count is set to 0, where it remains until the next setpoint change. At step 632 the normal noise calculation algorithm is enabled.

At step 634, a determination is made whether 5 small setpoint updates (a small setpoint change is hereby defined to mean a change of less than 6%) have occurred within a predetermined period. Ordinarily, the sequence of steps 612 through 626, described above are not performed for small setpoint changes; filter 14 doesn't perturbate from a single small change, so there is no need to adjust the MSD or DSD.

If, however, at step 634, there are several small changes to the setpoint during a predetermined period, then the operator is slowly adjusting the system, and control is passed to step 636. At step 636, a small adjustment is made to the MSD to prevent filter 14 from perturbating based on the cumulative change over a short period. Control is then returned to step 600 to repeat the loop.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. In a vibratory weigh feeding system having a material container, an actuator for vibrating the container, weighing apparatus for sensing the weight of the material being discharged and apparatus for estimating the material discharge rate, a method for controlling the actuator to adjust the discharge rate, comprising the steps of:
   (a) establishing a plurality of drive command values;
   (b) associating a respective predicted discharge rate and a respective reliability factor with each respective drive command value;
   (c) estimating the current discharge rate;
   (d) selecting a drive command value associated with one of the predicted discharge rates that is substantially equal to a previously selected setpoint discharge rate;
   (e) reducing the selected drive command value according to the respective reliability factors associated with two of the predicted discharge rates that are closest to the setpoint, forming a reduced drive command value;
   (f) transmitting a drive command signal representing the reduced drive command value to the actuator; setting the discharge rate; and
   (g) increasing the respective reliability factor associated with the selected drive command value, if the respective predicted discharge rate differs from the estimated discharge rate by less than a predetermined amount.

2. A method in accordance with claim 1, further comprising the step of:
   (h) repeating steps (c), (f) and (g) until the discharge rate is substantially equal to the setpoint discharge rate.

3. A method in accordance with claim further comprising the step of:
   (i) updating the value of the predicted discharge rate associated with the selected drive command value to a new predicted discharge rate value that is based on the current values of the predicted discharge rate and the estimated discharge rate, the updating being performed each time step (g) is executed.

4. A method in accordance with claim 3, further comprising the steps of:
   (j) storing the current value of each respective predicted discharge rate and reliability factor when any one of the reliability factors increases to a predetermined maximum value;

(k) detecting when the predicted discharge rate for the current drive command value differs from the respective rate stored in step (j) by more than a predetermined ratio; and (l) multiplying each of the predicted discharge rates by the ratio when the detecting occurs.

5. A method in accordance with claim 4, further comprising the step of:

(m) reducing each of the reliability factors when step (l) is executed.

6. A method in accordance with claim 3, further comprising the steps of:

(n) storing the current value of each respective predicted discharge rate and reliability factor when any one of the reliability factors increases to a predetermined maximum value;

(o) detecting a request by an operator to rescale the predicted discharge rate values; and (p) multiplying each of the stored predicted discharge rate values by a value that is determined by an input parameter in the request by the operator, in response to the request.

7. A method in accordance with claim 6, further comprising the step of:

(q) reducing each respective reliability factor that is greater than a predetermined clamping value to the clamping value when step (m) is executed.

8. A method in accordance with claim 2, further comprising the step of:

(r) reducing each respective reliability factor by a predetermined amount when the material container is substantially empty and the feeder stops.

9. A method in accordance with claim further comprising the steps of:

(s) performing a calibration operation before executing step (c); and (t) increasing each respective reliability factor to a predetermined value that is greater than the value of the factor established in step (b).

10. A method in accordance with claim 1, wherein step (c) includes the steps of:

(u) receiving weight measurements from the weighing apparatus; and (v) filtering the weight measurements in a Kalman filter.

11. A method in accordance with claim 10, wherein the Kalman filter has a time constant and step (c) includes the step of:

(w) reducing the time constant when the feeding system is started up.

12. A method in accordance with claim 10, wherein the Kalman filter has a time constant and step (c) includes the step of:

(x) reducing the time constant when the setpoint changes.

13. A method in accordance with claim 10, wherein step (c) includes the step of:

(y) biasing the Kalman filter to avoid perturbation, when the feeding system is started and when the setpoint changes.

14. A method in accordance with claim 13, wherein the step of biasing the Kalman filter includes the step of:

(z) determining an amount of bias based on the reliability factors associated with the predicted discharge rates closest to the setpoint.

15. In a vibratory weigh feeding system having a material container, an actuator for vibrating the container, weighing apparatus for sensing the weight of the material being discharged, apparatus for controlling the actuator to adjust the discharge rate, comprising:

means for storing a plurality of drive command values, each drive command value having a respective predicted discharge rate and a respective reliability factor with each respective drive command value;

means coupled to the storing means for selecting a drive command value associated with one of the predicted discharge rates, such that the one predicted discharge rate is substantially equal to a setpoint discharge rate;

means responsive to the selecting means for reducing the selected drive command value according to the two respective reliability factors associated with the two predicted discharge rates closest to the setpoint, forming a reduced drive command value;

means responsive to the reducing means for transmitting a drive command signal representing the reduced drive command value to the actuator, the actuator setting the discharge rate according to the drive command signal;

means for estimating the current discharge rate; and means coupled to the storing means and the estimating means for increasing the respective reliability factor associated with the selected drive command value, if the respective predicted discharge rate differs from the estimated discharge rate by less than a predetermined amount.

* * * * *